(12) United States Patent
Lockhart et al.

(10) Patent No.: US 11,477,261 B2
(45) Date of Patent: Oct. 18, 2022

(54) SYSTEM AND METHOD FOR RENDERING ELECTRONIC CONTENT

(71) Applicant: D2L CORPORATION, Kitchener (CA)

(72) Inventors: David Lockhart, Kitchener (CA);
Nicholas Dingle, Kitchener (CA);
Pablo Lleras, Kitchener (CA)

(73) Assignee: D2L Corporation, Kitchener (CA)

( * ) Notice: Subject to any disclaimer, the term of this patent is extended or adjusted under 35 U.S.C. 154(b) by 0 days.

(21) Appl. No.: 14/558,894

(22) Filed: Dec. 3, 2014

(65) Prior Publication Data

US 2016/0094612 A1    Mar. 31, 2016

Related U.S. Application Data

(60) Provisional application No. 62/056,782, filed on Sep. 29, 2014.

(51) Int. Cl.
| | |
|---|---|
| *H04L 67/02* | (2022.01) |
| *H04L 67/00* | (2022.01) |
| *H04L 67/06* | (2022.01) |
| *G06F 16/958* | (2019.01) |
| *G06F 16/957* | (2019.01) |
| *H04L 67/5651* | (2022.01) |

(52) U.S. Cl.
CPC .......... *H04L 67/02* (2013.01); *G06F 16/9577* (2019.01); *G06F 16/986* (2019.01); *H04L 67/06* (2013.01); *H04L 67/34* (2013.01); *H04L 67/5651* (2022.05)

(58) Field of Classification Search
CPC ........................................................ H04L 67/02
USPC ........................................................ 709/217
See application file for complete search history.

(56) References Cited

U.S. PATENT DOCUMENTS

| | | | | |
|---|---|---|---|---|
| 8,201,224 | B1* | 6/2012 | Spertus | G06F 21/6218 |
| | | | | 713/153 |
| 8,775,520 | B1* | 7/2014 | Lewis | H04L 51/066 |
| | | | | 709/206 |
| 2003/0093525 | A1* | 5/2003 | Yeung | H04L 29/06 |
| | | | | 709/225 |
| 2005/0144155 | A1* | 6/2005 | Van Vlimmeren | G06F 16/957 |
| 2012/0185358 | A1* | 7/2012 | Ajjarapu | G06Q 30/06 |
| | | | | 705/26.62 |

(Continued)

*Primary Examiner* — Kevin S Mai
(74) *Attorney, Agent, or Firm* — Amarok IP Inc.; Neil W. Henderson

(57) ABSTRACT

A method and system for rendering electronic content is provided. The method includes: receiving a request for electronic content; retrieving browser data associated with a browser configured to render the electronic content; determining a nature of the electronic content; reviewing the browser data in relation to the nature of the electronic content to determine whether the browser supports the electronic content; and if the browser supports the electronic content, transmitting the electronic content supported by the browser. The system includes: a connection module configured to receive a request for electronic content; a browser module configured to retrieve browser data; a content module configured to determine a nature associated with the electronic content; a rendering module configured to review the browser data in relation to the nature of the electronic content to determine whether the browser supports the electronic content.

20 Claims, 4 Drawing Sheets

(56) References Cited

U.S. PATENT DOCUMENTS

2014/0087349 A1* 3/2014 Kitch ................... G09B 5/065
  434/308
2014/0201625 A1* 7/2014 Scrocchi ............ G06F 17/2247
  715/255

* cited by examiner

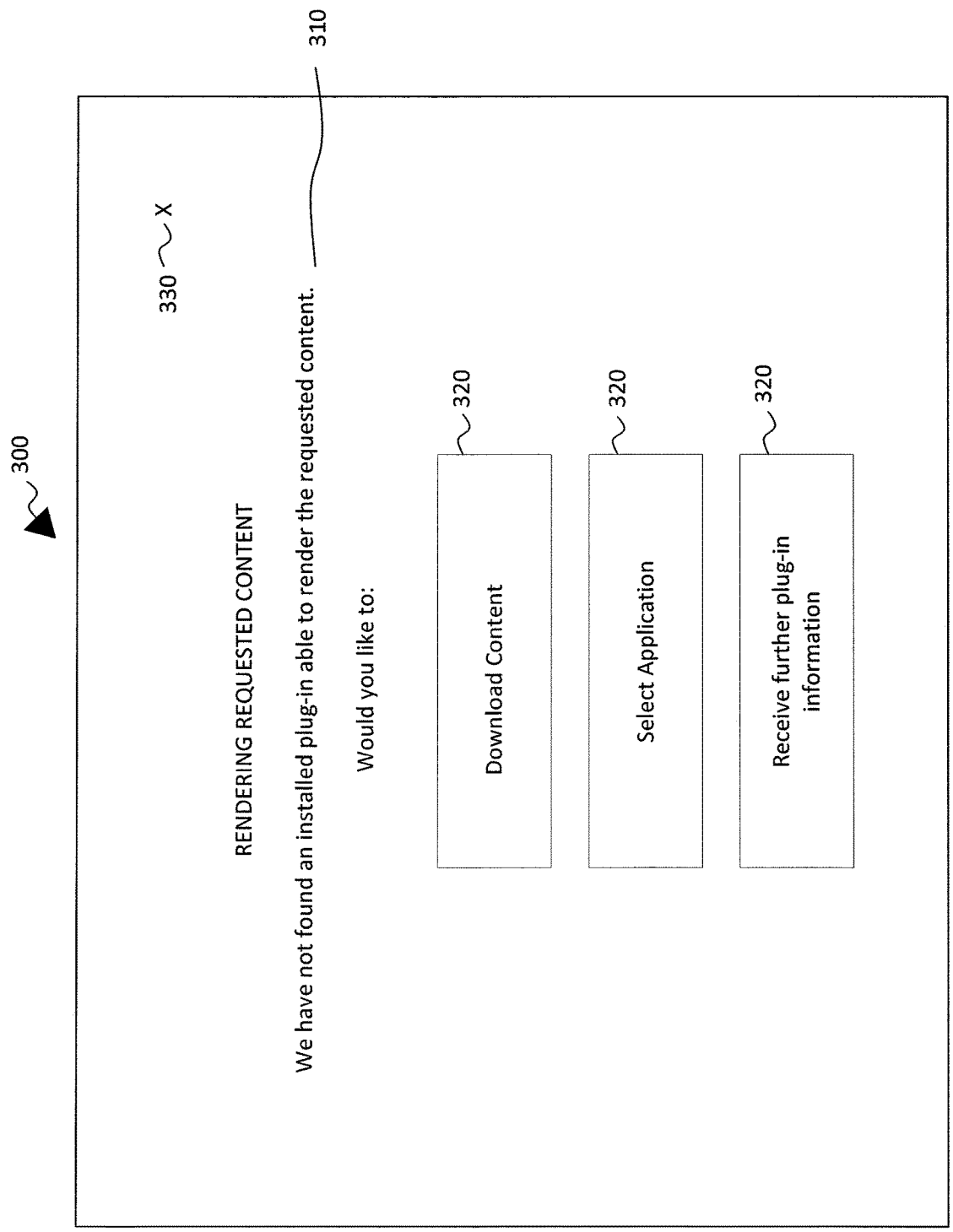

SYSTEM AND METHOD FOR RENDERING ELECTRONIC CONTENT

FIELD

The present disclosure relates generally to computer networks. More particularly, the present disclosure relates to a system and method for rendering electronic content.

BACKGROUND

The Internet has become an important tool in delivering electronic content to users. Users are now able to retrieve a variety of types of electronic content, and frequently use the Internet to view videos, review presentations, read documents, and the like. These types of electronic content may be presented in various file formats.

Various Internet websites are taking advantage of being able to deliver different types of electronic content to users, in order to provide users with more content or more detailed content, for example, newspaper websites may now include video discussion of the news article; educational intuitions may provide papers or videos on various topics for students to review, and the like. As the Internet allows for the various types of electronic content to be delivered to the users, Internet browsers and other systems delivering content need to provide a manner for the user to retrieve the content.

It is, therefore, desirable to provide an improved method and system for rendering electronic content.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a method for rendering electronic content including: receiving a request for electronic content; retrieving browser data associated with a browser configured to render the electronic content; determining a nature of the electronic content; reviewing the browser data in relation to the nature of the electronic content to determine whether the browser supports the electronic content; and if the browser supports the electronic content, transmitting the electronic content supported by the browser.

In a particular case, the method may further include: determining at least one element within the electronic content; determining element data related to the at least one element; reviewing the browser data in relation to the element data to determine whether the browser supports the at least one element; and if the browser supports the at least one element, transmitting the at least one element supported by the browser.

In another particular case, the method may further include: if the browser does not support the electronic content, determining whether the electronic content is convertible to a format supported by the browser; converting the electronic content to a supported format; transmitting the converted electronic data; otherwise, if the electronic content is not convertible, providing user options with respect to retrieving the electronic content.

In still another particular case, the user options may include an option to download the electronic content to the user device or may include an option to download an associated plug-in with the electronic content.

In yet another particular case, the method may include if the browser does not support electronic content, providing user options with respect to retrieving the at least one element.

In still yet another particular case, the user options may be selected from a group consisting of: converting the at least one element, downloading the at least one element, downloading a plug-in associated with the at least one element and allowing a user to select an application to display the at least one element.

In a particular case, the browser data may include browser type, browser version, or browser plug-ins.

In another particular case, the browser data may include application data.

In still another particular case, determining whether the browser supports each of the electronic content may further include: reviewing the application data; and determining whether application data includes a software application capable of rendering the electronic content.

In yet another particular case, the browser data may further include user device data.

In still yet another particular case, determining whether the browser supports the electronic content may further include: reviewing the user device data; and determining whether user device data includes an indication of whether the user device is capable of rendering the electronic content.

In a further aspect, there is provided a system for rendering electronic content including: a connection module configured to receive a request for electronic content; a browser module configured to retrieve browser data associated with a browser configured to render the electronic content; a content module configured to determine a nature associated with the electronic content; a rendering module configured to review the browser data in relation to the nature of the electronic content to determine whether the browser supports the electronic content; and the connection module is further configured to transmit the electronic content if the electronic content is supported by the browser.

In a particular case, the content module may be further configured to: determine at least one element within the electronic content; and determining element data related to the at least one element; and the rendering module may be further configured to: review the browser data in relation to the element data to determine whether the browser supports the at least one element; and if the browser supports the at least one element, provide for the transmitting of the at least one element supported by the browser.

In another particular case, the system may further include a converter configured to convert the electronic content not supported by the browser to a format supported by the browser.

In still another particular case, the rendering module may be further configured to provide user options with respect to the electronic content not supported by the browser.

In yet another particular case, the user options may be selected from a group consisting of: converting the electronic content, downloading the electronic content, downloading a plug-in associated with the electronic content, and allowing a user to select an application to display the at least one element.

In still yet another particular case, the browser data may include application data or user device data.

In another particular case, the rendering module may be further configured to: review the application data; and determine whether application data includes a software application capable of rendering the electronic content.

In yet another particular case, the rendering module may be further configured to: review the user device data; and determine whether user device data includes an indication of whether the user device is capable of rendering the electronic content.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 4 is an example user notification according to an embodiment.

DETAILED DESCRIPTION

The following description with reference to the accompanying drawings is provided to assist in a comprehensive understanding of example embodiments as defined by the claims and their equivalents. The following description includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding. Accordingly, it should be apparent to those skilled in the art that the following description of embodiments is provided for illustration purposes only and not for the purpose of limiting the invention as defined by the appended claims and their equivalents.

Generally, the present disclosure provides a method and system for rendering electronic content, for example, a website with a plurality of elements of various formats. The system receives a request for electronic content and is configured to determine the type of content requested. Further the system is configured to retrieve browser data and determine whether the browser can render the content. If the browser is unable to render the electronic content, the system determines whether the content can be converted. If the content can be converted, the system may convert the content and load the content to be viewed by a user. If the system determines that the content can not be converted, the system may provide viewing options and the user may select an appropriate viewing option to render the electronic content.

Users may use a variety of browsers to access and view content on the Internet, the most common types of browsers tend to be: Microsoft™ Internet Explorer™, Google™ Chrome™, Apple™ Safari™ and Mozilla™ Firefox™. Browsers typically use "plug-ins" or helper programs to display at least some of the types of content. Some of these browsers may push upgrades or plug-ins to their users to allow users to view a variety of types of documents though the browser. Other browsers may have plug-ins available and may only request that users install the upgrade or plug in if the user attempts to access a specific type of electronic content.

Figure 1:
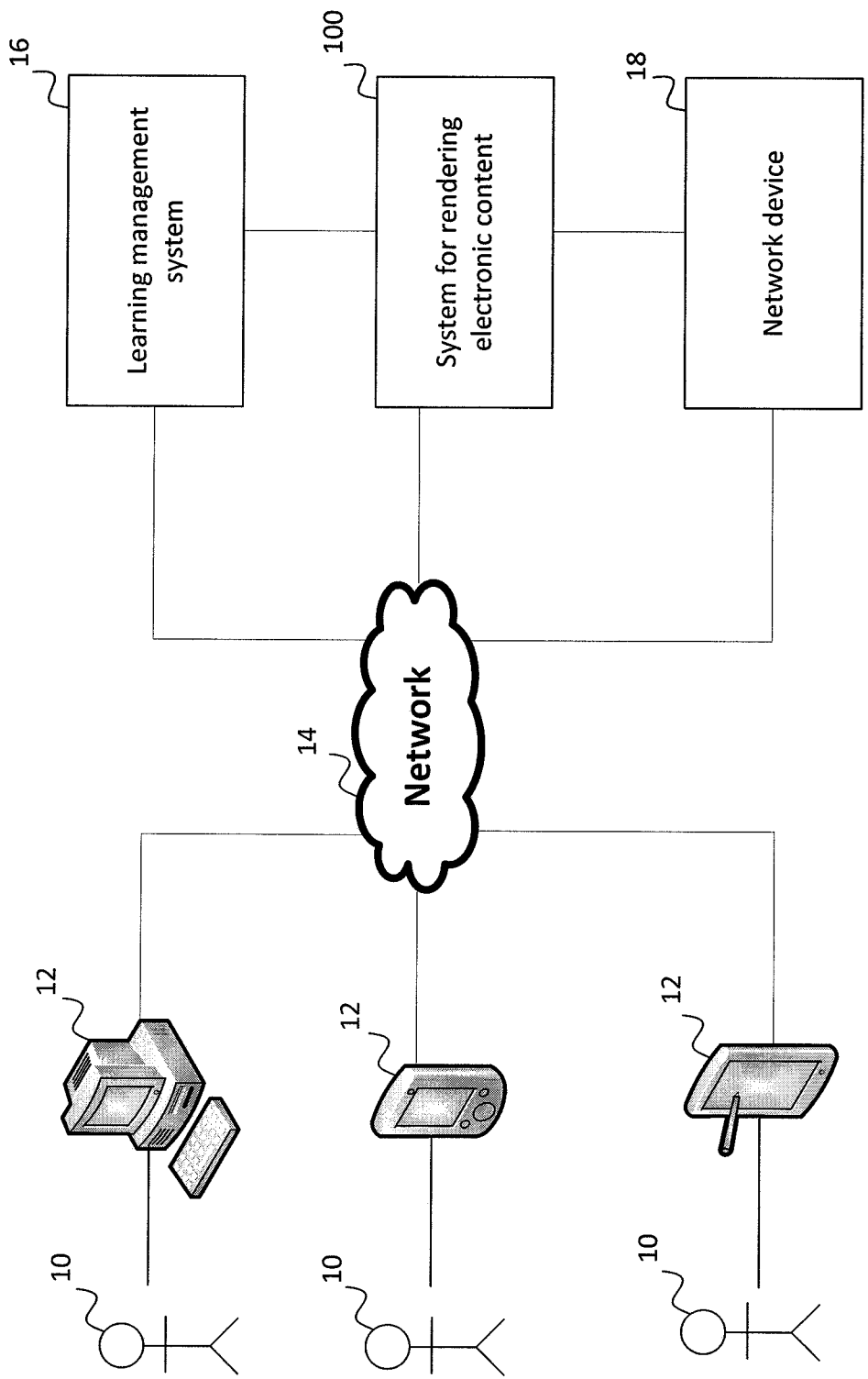
FIG. 1 is an example environment for an embodiment of a system for rendering electronic content according to an embodiment.

FIG. 1 illustrates an example environment for a system 100 for rendering electronic content. Users 10 access a network 14, for example, the Internet, an Intranet, a Local Area Network (LAN), a Virtual Local Area Network (VLAN), or the like, via user devices 12. The user devices 12 may access the network 14 via a browser application. The user 10 may wish to access, via the network 14, a learning management system 16 or other network device 18, for example, a server hosting electronic content.

The system 100 for rendering electronic content may be operatively connected to a plurality of network devices 18, and/or one or more learning management systems 16. In some cases, the system 100 may be a component within a network device 18, or a learning management system 16. The system 100 is intended to interact with the network device 18 and the browser application on the user device 12 to render the electronic content requested by the user and hosted on the network device.

Figure 2:
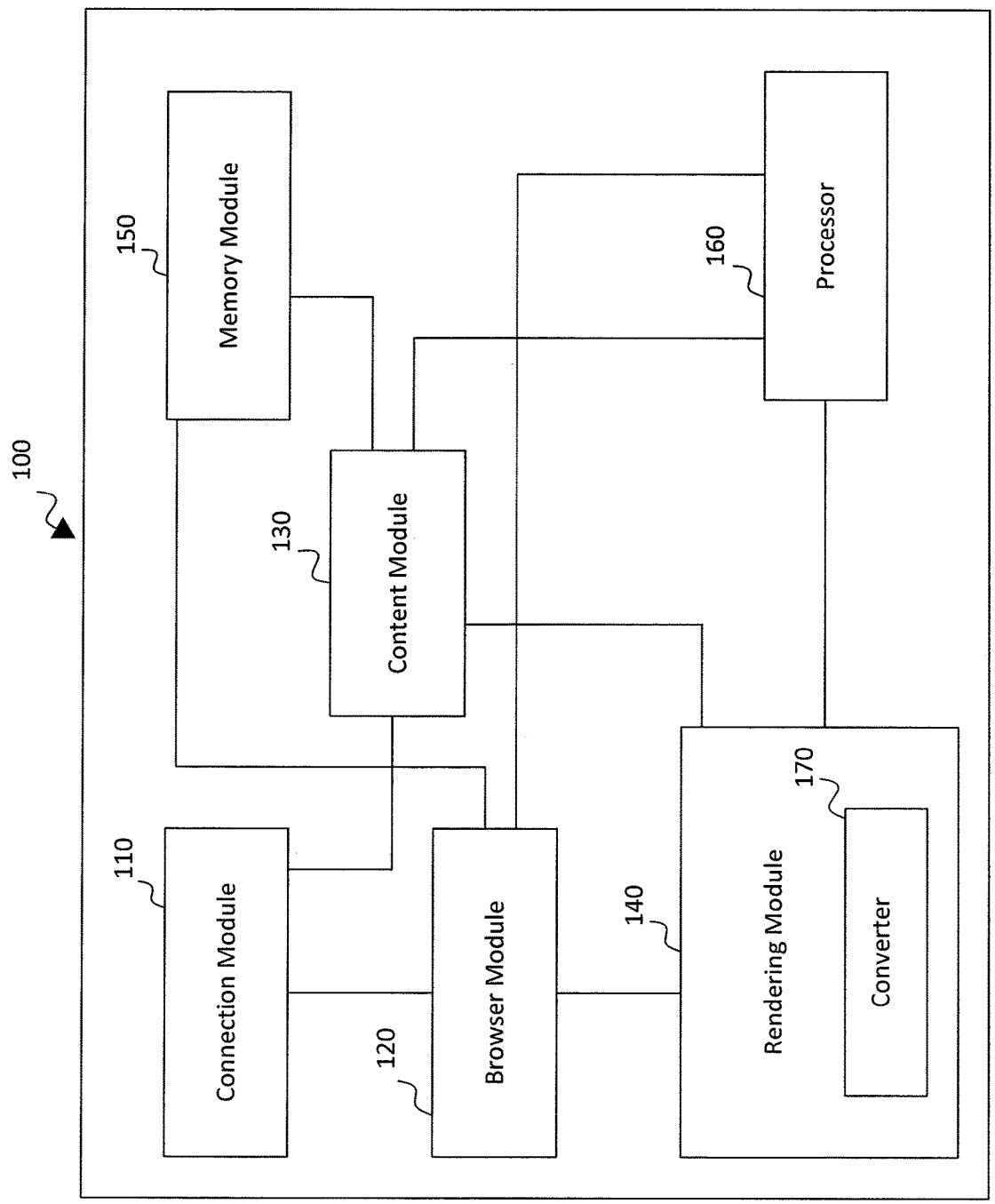
FIG. 2 is a system for rendering electronic content according to an example embodiment.

FIG. 2 illustrates an example embodiment of the system 100 for rendering electronic content. The system includes a connection module 110, a browser module 120, a content module 130, a rendering module 140, a memory module 150 and a processor 160.

The connection module 110 is configured to receive a request for electronic content from a user device 12, directed to learning management system 16, or other network device 18 via the network 14, or directly from a network device 18 or learning management system 16. The connection module 110 is configured to review the request and transmit the request to the browser module 120 and/or the content module 130. The connection module 110 may be configured to parse the request to determine data related to the user device 12 requesting the electronic content and data related to the electronic content. In some cases, the connection module 110 may be a connection module for the network device when the system 100 is incorporated with a network device 18.

The browser module 120 is configured to determine browser data associated with the user device 12 requesting the electronic content. The browser module 120 is configured to determine the version and type of browser being used by the user device 12, and may further gather data related to the plug-ins available for the browser, for example whether the user has an Adobe™ Reader™ plug-in installed to view Portable Document Format (PDF) file types. In other cases, the browser module 120 may be configured to determine application data, such as data related to various software applications installed on the user device, for example Microsoft™ Office™, a computer aided design (CAD) application, a database modeling application, Photoshop™ documents, audio files, or the like.

The content module 130 is configured to determine the type of electronic content requested. In some cases, the request may be for a web page and the content module 130 may determine whether the web page includes at least one element and determine element data, for example, the type of element such as, a word document, a video, a PDF document, a presentation, a CAD document, or the like, the size of the element, and the like. The content module 130 may determine a plurality of electronic elements requested and determine element data for each element.

The rendering module 140 is configured to render the electronic content requested by the user. The rendering module 140 is configured to receive browser data from the browser module 120 and receive the element data from the content module 130. By reviewing the browser data in relation to the element data, the rendering module 140 is configured to determine whether the browser supports each element natively. If any of the elements are supported, the rendering module 140 is configured to allow the browser to load the content to take advantage of the browser's native rendering of any of the supported elements.

In some cases, the rendering module 140 may include a converter 170. The converter 170 is configured to convert an element of the requested content to a file format that can be rendered by the browser. If the rendering module 140 determines that any element may not be rendered in the browser but may be converted to a format that can be rendered by the browser, the converter 170 may receive the element and may convert the element to a supported format.

In an example, the browser module 120 may determine that the user device does not include a PDF plug-in nor is the browser able to render PDF documents. The content module 130 determines that there is at least one PDF element in the requested content. The rendering module 140 will determine that the element is not supported and the converter 170 may render the element to a supported format, for example rendering each page of the PDF element as an image. The rendering module 140 may replace the original PDF element with the converted element and then allow the requested content to be rendered by the browser of the user device 12.

The rendering module 140 is further configured to provide a user a download option for an element that may not be converted. If the rendering module 140 determines the format of an element is not able to be converted by the converter 170, the rendering module 140 may, instead of displaying the an error to the user with respect to the element, display an object to the user and allow the user to download the element and then select an application to view the element.

In some cases, the rendering module 140 will provide options to the user and request user input with respect to converting the element or downloading the element. In some cases, the options may be presented via a user notification or a user message. The user may select to download the element or have the converter 170 convert the element to a format supported by the browser.

The system 100 may further include a memory module 150. In some cases, the memory module 150 may store data related to formats that can be rendered by various versions of browser applications. The memory module 150 may be further configured to store browser data and or element data which may be later retrieved by the modules of the system.

The processor 160 of the system 100 is configured to co-ordinate and execute the instructions of the modules. In some cases, the processor 160 may be a central processing unit of a network device 18 or may be a specific processor for the system. In other cases, each module within the system 100 may include a processor. In still other cases, the system 100 may be a distributed system and may include modules on a plurality of network devices. In this case, there may be a plurality of processors executing instructions of the system 100.

Figure 3:
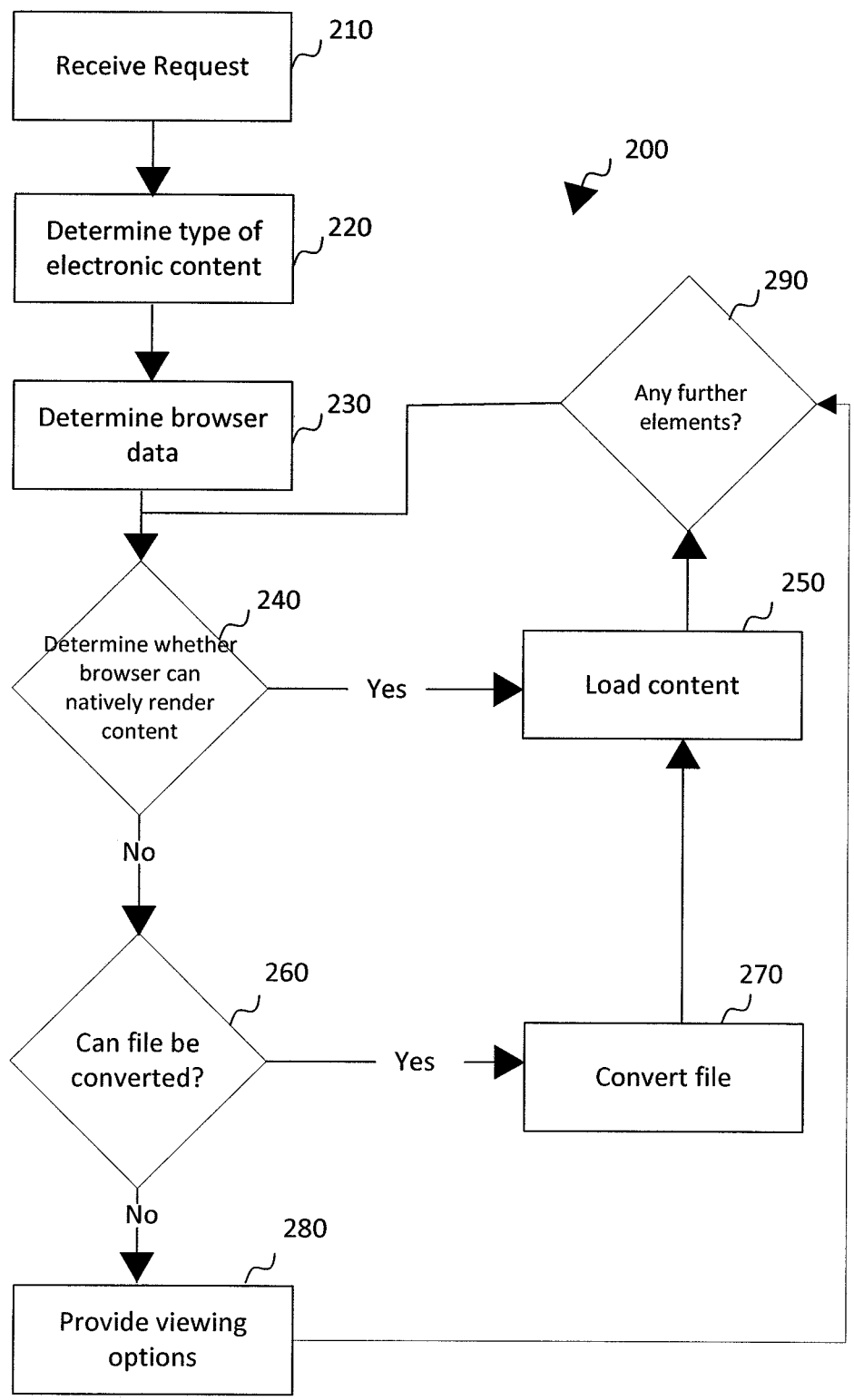
FIG. 3 is a flowchart of a method for rendering electronic content according to an example embodiment.

FIG. 3 illustrates a method 200 for rendering electronic content. At 210, the connection module 110 receives a request for electronic content.

At 220, the content module 130 determines the nature of the content requested, including any elements related to the request and element data related to the elements. In some cases, a plurality of elements is related to the request and the content module 130 determines element data, for example, element format type, element size, and the like, related to each element.

At 230, the browser module 120 determines the browser data related to the browser on the user device. Browser data may include details related to the browser, for example the type and version of the browser, and may further include details related to plug-ins downloaded and/or plug-ins supported by the browser. In some cases, browser data may include software applications that may interact with the browser and are currently installed on the user device.

Although shown as sequential, it will be understood that determining the nature of the content and determining browser data may occur simultaneously.

At 240, the rendering module 140 determines whether the browser is currently or natively able to render the elements, based on the browser data and the nature of the element and the element data.

At 250, if the browser can render an element, the electronic content and any element that may be rendered by the browser will be loaded by, for example, the processor, on the user device. In some cases, the processor may provide instructions to the user device to load the electronic content.

At 260, if the browser is not able to render at least one element, the rendering module will determine whether the element can be converted to a format that can be rendered by the browser.

At 270, any element that can be converted will be converted by the converter module 170.

At 250, the converted element may be sent, by for example, the processor, and rendered by the browser on the user device.

At 280, the rendering module 140 may associate viewing options with an element that can not be converted. The system 100 will provide the user with at least one viewing option, via a user notification. In some cases, the user will be presented with an option to download the element. In other cases, the user may be presented with an option to select a locally installed software application to open the element.

In some cases, the system 100 may determine whether there is a plug-in available for the version and type of browser that is not currently installed. Data related to available plug-ins for browser versions and types may be stored in the memory module 150 or may be queried from a third party database which stores information related to plug-ins for various browsers. The system 100 may then determine whether there is a plug-in available for the browser that would allow the element to be rendered in the browser. The user notification may contain an option to review the information about the available plug-in, a click to install the plug-in or may instead automatically download the plug-in which will allow the browser to render the element.

In some cases, a user may be presented with at least one viewing option prior to converting the element. The user may select to download the element instead of having the element converted and rendered by the browser of the user device.

At 290, the system determines whether there are any further elements to be reviewed. If there are further elements, the system may again determine whether the browser can natively or currently render the element, at 240. The system will then proceed with the method with any further elements. If there are no further elements, the connection module may transmit the requested content with the converted and non converted elements and any viewing options for elements not able to be converted to the user device.

FIG. 4 illustrates an example user notification 300 providing a plurality of options to the user with respect to the elements that are not supported by the browser.

The user notification 300 is intended to provide information regarding the rendering of the electronic content. The notification may include a message section 310, which is intended to describe the situation to the user. The message section 310 may describe the element that the browser is not able to render or may tell the user that there is at least one element that may not be rendered. The notification 300 may further include a plurality of user options 320 where the user is able to select an action to be performed on the element that has not been rendered.

The user options 320 may include options, such as, an option to download the element or electronic content, an option for the user to select a software application to render the element or electronic content, an option to download a plug-in or review further information regarding a possible plug-in, or the like.

The user notification 300 may also include a cancel or ignore option 330, which will allow the electronic content to render with an error or blank element where the browser is not able to render at least one element. Any remaining elements that are supported by the browser may be rendered accordingly.

In an example, the content module 130 may determine that an element to be rendered is a Word™ document or a presentation element. The browser module 120 may determine that the user device is using Internet Explorer™ and the user has Microsoft™ Office™ installed. The rendering module 140 may render the element in the user's version of the appropriate Microsoft Office application.

In another example, the content module 130 may determine that the element is a PDF document and the browser module 120 may determine the user is using a version of Firefox™ that natively renders PDF documents. The rendering module 140 will allow Firefox to render the PDF document as no further plug-in would be required to render the element or electronic content.

In another example, the content module 130 may determine that the user device does not include Microsoft Office or a similar product and the browser is unable to render a Word document. The rendering module 140 may convert the Word document to images that can easily be rendered by the browser, although the user would lose the ability to edit the rendered content.

In some embodiments, the system 100 may be used with or included in a learning management system. The system 100 may include an option for an administrator or an instructor to include specific types of elements that may be rendered by a browser within the learning management system. The specific types of elements that may be supported in the learning management system may be stored in the memory module 150 which may be queried by the browser module 130 when determining what types of elements may be rendered by the browser.

In some cases, the learning management system 100 may include specific applications related to courses taught by the learning institution, for example, a computer science instructor may include an element type for displaying source code or other form of programming language, an engineering instructor may include an element type for displaying CAD elements, or the like. When a student requests the electronic content, the rendering module 140 determines whether or not the browser within the learning management system 16 may render the type of element.

In another example, when the browser module 120 determines browser data, the browser module 120 may further determine user device data, for example, user device type, user device location, or the like. In some cases the user device data may override the browser data, for example, if it is determined that the user device is an iPad™ with a specific version of iOS™, even if an Adobe™ plug-in is installed, the rendering module 140 may determine to convert a PDF element to an image element as certain versions of iOS may not render the PDF element correctly.

In a further example, when the browser module 120 determines browser data the browser module 120 determines user device data such as user device location. In some cases, the browser module 120 may determine that the user device is located within a computer lab of an institutional setting and, as such, may determine that element of a specific nature may take advantage of software applications loaded on the user devices within the computer lab. The system 100 may transmit elements of the specific nature as the system 100 may determine these elements can be rendered natively on the user devices within the computer lab.

The same user may later access the same electronic content from a user device located outside the computer lab or learning institution. The browser module 120 may determine that, as the user location is outside the computer lab, the user device's browser does not contain the support required to render the element that was previously rendered natively on a computer lab browse. The rendering module 140 may either determine to convert the element to a supported format, or provide the user with a user notification and allow the user to determine how to render the element.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for rendering electronic content comprising:
receiving, by one or more processors, a request for electronic content from a user device operated by a user, wherein the electronic content is within a learning management system;
retrieving, by one or more processors, browser data associated with a browser wherein the browser data comprises whether the browser is in the learning management system;
determining, by one or more processors, a nature of the electronic content;
reviewing, by one or more processors, the browser data in relation to the nature of the electronic content to determine whether the browser supports the electronic content;
if the browser supports the electronic content, transmitting, by one or more processors, the electronic content supported by the browser;
if the browser does not support the electronic content, either:
if the browser is within the learning management system, querying a memory module to determine whether the electronic content is supported by an application within the learning management system and allowing the electronic content to be rendered by the application within the learning management system; or
determining, by one or more processors, whether the electronic content is convertible to a file type supported by the browser, and
if the electronic content is convertible to a file type supported by the browser, providing the user an option to download or convert the electronic content;
if the user selects to convert the electronic content then:
converting the electronic content to a supported file type; and
transmitting the converted electronic data;
if the user selects to download the electronic content then:
providing, by one or more processors, user options with respect to retrieving the electronic content, wherein the user options include an option to select a locally installed software application to open the electronic content;
otherwise, if the electronic content is not convertible to a file type supported by the browser, providing, by one or more processors, user options with respect to retrieving the electronic content, wherein the user options include an option to select a locally installed software application to open the electronic content.

2. The method of claim 1, further comprising:
determining at least one element within the electronic content;
determining element data related to the at least one element;
reviewing the browser data in relation to the element data to determine whether the browser supports the at least one element; and
if the browser supports the at least one element, transmitting the at least one element supported by the browser.

3. The method of claim 1, wherein the user options comprise an option to download the electronic content to the user device.

4. The method of claim 1, wherein the user options comprise an option to download an associated plug-in with the electronic content.

5. The method of claim 1, wherein the user options are selected from a group consisting of: downloading the at least one element, downloading a plug-in associated with the at least one element, and allowing a user to select an application to display the at least one element.

6. The method of claim 1 wherein the browser data comprises, browser type, browser version, or browser plug-ins.

7. The method of claim 1 wherein the browser data further comprises application data.

8. The method of claim 7 wherein the determining whether the browser supports each of the electronic content further comprises:
reviewing the application data; and
determining whether application data includes a software application capable of rendering the electronic content.

9. The method of claim 1 wherein the browser data further comprises user device data.

10. The method of claim 9 wherein the determining whether the browser supports the electronic content further comprises:
reviewing the user device data; and
determining whether user device data includes an indication of whether the user device is capable of rendering the electronic content.

11. The method of claim 1, further comprising:
receiving a request from an administrator of a learning management system, the request including one or more types of electronic content that are to be rendered in the browser;
in response to receiving the request from the administrator of the learning management system, storing in a memory the one or more types of electronic content as a file type that is supported by the browser.

12. The method of claim 1, wherein the reviewing the browser data in relation to the nature of the electronic content to determine whether the browser supports the electronic content comprises:
querying a memory module associated with a learning management system from which the electronic content is requested, the querying comprising determining one or more types of elements that the browser is permitted to render.

13. The method of claim 1, wherein the browser data comprises of user device location data.

14. A system for rendering electronic content comprising:
one or more processors configured to:
receive a request for electronic content, wherein the electronic content is within a learning management system;
retrieve browser data associated with a browser, wherein the browser data comprises whether the browser is in the learning management system;
determine a nature of the electronic content;
review the browser data in relation to the nature of the electronic content to determine whether the browser supports the electronic content;

if the browser supports the electronic content, transmit the electronic content supported by the browser;
if the browser does not support the electronic content, either:
- if the browser is within the learning management system, querying a memory module to determine whether the electronic content is supported by an application within the learning management system and allowing the electronic content to be rendered by the application within the learning management system; or
- determine whether the electronic content is convertible to a file type supported by the browser, and
  - if the electronic content is convertible to a file type supported by the browser, provide the user an option to download or convert the electronic content;
    - if the user selects to convert the electronic content then:
      - convert the electronic content to a supported file type; and
      - transmit the converted electronic data;
    - if the user selects to download the electronic content then:
      - provide user options with respect to retrieving the electronic content, wherein the user options include an option to select a locally installed software application to open the electronic content;
  - otherwise, if the electronic content is not convertible to a file type supported by the browser, provide user options with respect to retrieving the electronic content, wherein the user options includes an option to select a locally installed software application to open the electronic content; and a memory coupled to the one or more processors and configured to provide the one or more processors with instructions.

15. The system of claim 14, wherein
the one or more processors are further configured to:
determine at least one element within the electronic content;
determine element data related to the at least one element;
review the browser data in relation to the element data to determine whether the browser supports the at least one element; and
if the browser supports the at least one element, provide for the transmitting of the at least one element supported by the browser.

16. The system of claim 14 further comprising a converter configured to convert the electronic content not supported by the browser to a file type supported by the browser.

17. The system of claim 14, wherein the user options are selected from a group consisting of: downloading the electronic content, downloading a plug-in associated with the electronic content, and allowing a user to select an application to display the at least one element.

18. The system of claim 14 wherein the browser data further comprises application data or user device data.

19. The system of claim 18, wherein the rendering module is further configured to:
review the application data; and
determine whether application data includes a software application capable of rendering the electronic content.

20. The system of claim 18, wherein the rendering module is further configured to:
review the user device data; and
determine whether user device data includes an indication of whether the user device is capable of rendering the electronic content.

* * * * *